(12) United States Patent
Liu et al.

(10) Patent No.: US 8,329,134 B2
(45) Date of Patent: Dec. 11, 2012

(54) METHOD FOR FABRICATING CARBON NANOTUBE FILM

(75) Inventors: Liang Liu, Beijing (CN); Li Qian, Beijing (CN); Chen Feng, Beijing (CN); Yu-Quan Wang, Beijing (CN)

(73) Assignee: Beijing FUNATE Innovation Technology Co., Ltd., Bejing (CN)

( * ) Notice: Subject to any disclaimer, the term of this patent is extended or adjusted under 35 U.S.C. 154(b) by 276 days.

(21) Appl. No.: 12/750,227

(22) Filed: Mar. 30, 2010

(65) Prior Publication Data

US 2011/0159190 A1   Jun. 30, 2011

(30) Foreign Application Priority Data

Dec. 29, 2009 (CN) .......................... 2009 1 0265340

(51) Int. Cl.
*D01F 9/12*   (2006.01)
(52) U.S. Cl. ............... 423/447.1; 423/447.3; 423/447.6; 977/742; 977/762; 977/843
(58) Field of Classification Search ..... 423/447.1–447.3, 423/445 B; 977/742–754, 842–848, 762; 428/367
See application file for complete search history.

(56) References Cited

U.S. PATENT DOCUMENTS

| | | | | |
|---|---|---|---|---|
| 2008/0170982 | A1* | 7/2008 | Zhang et al. | 423/447.3 |
| 2009/0194313 | A1* | 8/2009 | Jiang et al. | 174/102 R |
| 2009/0289203 | A1* | 11/2009 | Jiang et al. | 250/492.1 |
| 2010/0183900 | A1* | 7/2010 | Wallin et al. | 428/698 |

FOREIGN PATENT DOCUMENTS

CN   101499331   *   8/2009

* cited by examiner

*Primary Examiner* — Daniel C McCracken
(74) *Attorney, Agent, or Firm* — Altis Law Group, Inc.

(57) ABSTRACT

A method for fabricating a carbon nanotube film includes the following steps: providing a vacuum chamber having a carbon nanotube array therein; and pulling a carbon nanotube film out from the carbon nanotube array.

17 Claims, 4 Drawing Sheets

METHOD FOR FABRICATING CARBON NANOTUBE FILM

CROSS-REFERENCE

This application claims all benefits accruing under 35 U.S.C. §119 from China Patent Application No. 200910265340.6, filed on Dec. 29, 2009 in the China Intellectual Property Office, the disclosure of which is incorporated herein by reference.

BACKGROUND

1. Technical Field

The present disclosure relates to a method for fabricating a carbon nanotube film.

2. Description of Related Art

Carbon nanotubes are tubules of carbon generally having a diameter of 0.5 to 100 nanometers, and composed of a number of coaxial cylinders of graphite sheets. Carbon nanotubes have interesting and potentially useful thermal, electrical and mechanical properties, and have recently attracted a great deal of attention for use in different applications such as field emitters, gas storage and separation, chemical sensors, and high strength composites. However, the main obstacle to an actual application of carbon nanotube use is their difficulty to process, due to the powder form of the carbon nanotube products. Therefore, carbon nanotubes are formed into films to facilitate handling and processing thereof.

A method for drawing a carbon nanotube film is disclosed in US patent application NO. 2008/0248235A1 to Feng et al., published on Oct. 9, 2008. This patent publication discloses the carbon nanotube film which is directly drawn from a carbon nanotube array by a tool. The drawn carbon nanotube film includes a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. This carbon nanotube film is a free standing film because the adjacent carbon nanotube segments are joined end-to-end by van der Waals attractive force therebetween. The carbon nanotube film is fabricated by using a selecting tool, such as an adhesive tape, to contact the carbon nanotube array; and pulling the carbon nanotubes at an even speed to form the carbon nanotube film. The carbon nanotube segments will be successively pulled out and joined end to end.

Generally, the carbon nanotube film manufactured by the above method is transparent. However, when the speed of pulling the carbon nanotube film is relatively fast, defects may form in the carbon nanotube film. The quality of the carbon nanotube film, such as its uniformity, is largely affected by the speed of pulling the carbon nanotube film. For example, if the speed of pulling is too fast, adjacent segments may not be firmly joined, some of the carbon nanotube segments may detach from the carbon nanotube film, or form clusters. Thus, the carbon nanotube film has a lower uniformity.

What is needed, therefore, is to provide a method for pulling the carbon nanotube film with fewer defects at a relatively fast speed.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
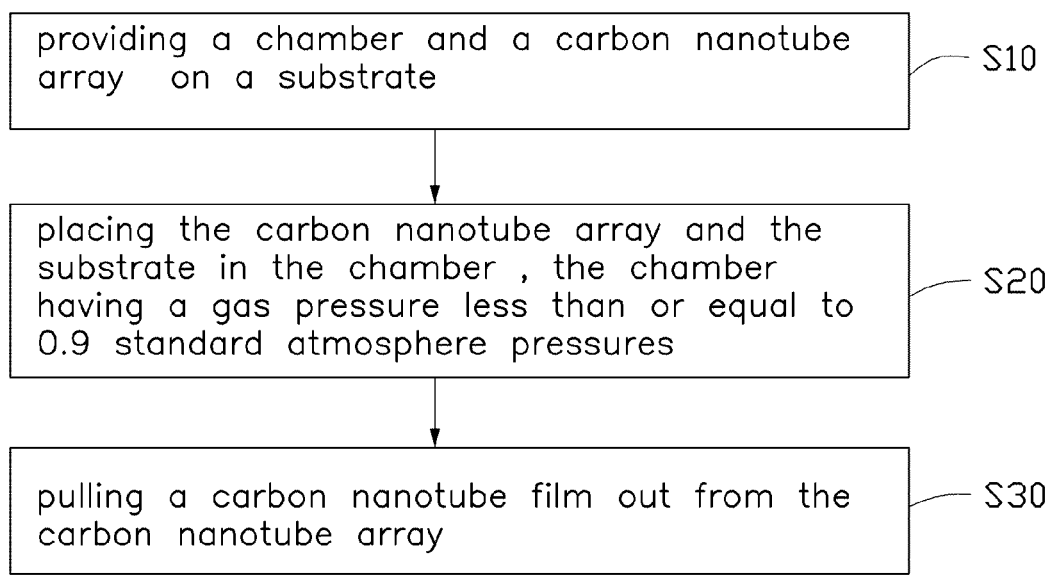
FIG. 1 is a flow chart of a method for fabricating a carbon nanotube film of one embodiment.
Figure 2:
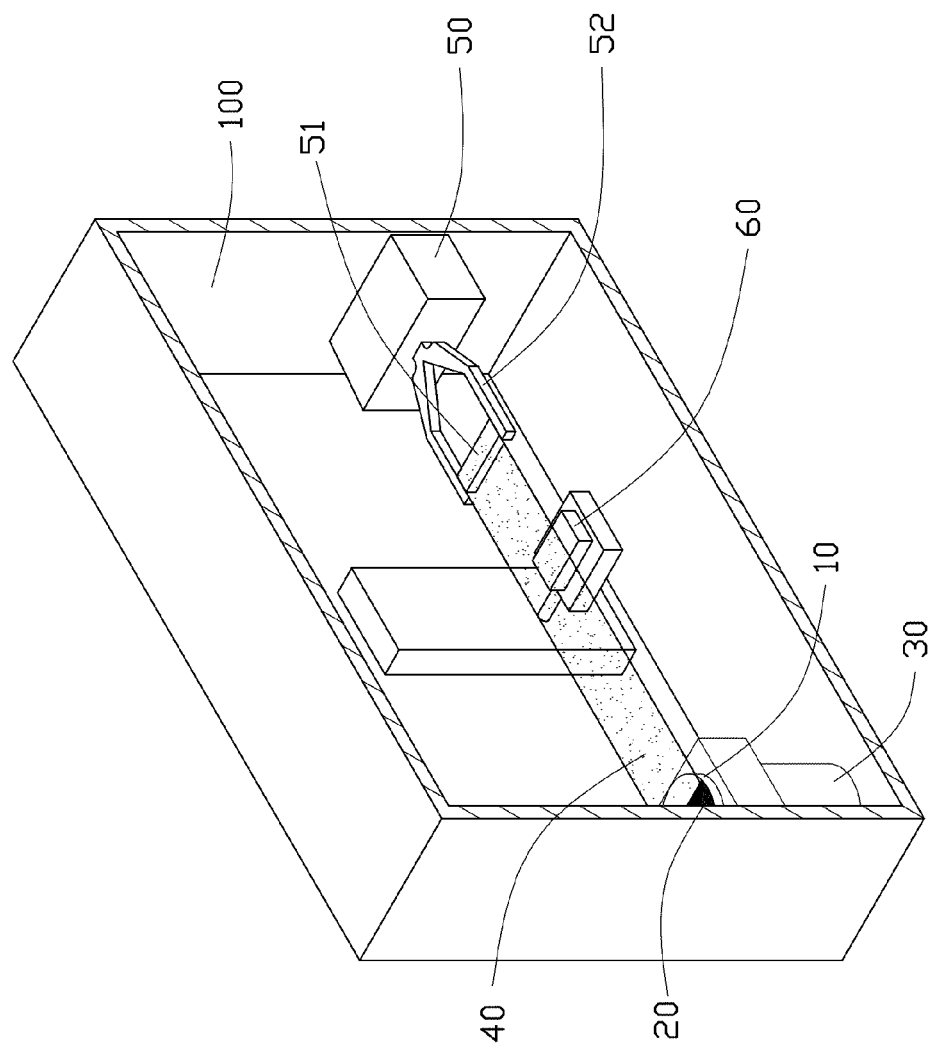
FIG. 2 is a schematic structural view of a process of fabricating the carbon nanotube film.

Referring to FIG. 1 and FIG. 2, a method for fabricating a carbon nanotube film 40 includes the following steps:

S10, providing a chamber 100 and a carbon nanotube array 20 on a substrate 10.

S20, placing the carbon nanotube array 20 and the substrate 10 in the chamber 100, the chamber 100 having a gas pressure less than or equal to 0.9 standard atmosphere pressures.

S30, pulling a carbon nanotube film 40 out from the carbon nanotube array 20.

In step S110, a substrate holder 30 may be provided to fix the substrate 10. The substrate holder 30 can include a planar surface. The substrate 10 can be fixed on the planar surface of the substrate holder 30 with a buckle or an adhesive.

The carbon nanotube array 20 can be super-aligned array of carbon nanotubes. However, any carbon nanotube array 20 from which a film can be drawn may be used.

The super-aligned array of carbon nanotubes can be formed by the steps of:

S101, providing a substantially flat and smooth substrate 10;

S102, forming a catalyst layer on the substrate 10;

S103, annealing the substrate 10 with the catalyst layer thereon in air at a temperature in an approximate range from 300° C. to 900° C. (such as 700° C.) for about 30 to about 90 minutes;

S104, heating the substrate 10 with the catalyst layer thereon at a temperature in an approximate range from 500° C. to 900° C. (such as 740° C.) in a furnace with a protective gas therein; and S105, supplying a carbon source gas to the furnace for about 5 to 30 minutes and growing a super-aligned array of carbon nanotubes on the substrate 10.

In step S101, the substrate 10 can be a P-type silicon wafer, an N-type silicon wafer, or a silicon wafer with a film of silicon dioxide thereon. Simultaneously, a 4 inch P-type silicon wafer can be used as the substrate 10. In step S102, the catalyst can be made of iron (Fe), cobalt (Co), nickel (Ni), or combinations thereof.

In step S104, the protective gas can be made up of at least one of nitrogen ($N_2$), ammonia ($NH_3$), and a noble gas. In step S105, the carbon source gas can be a hydrocarbon gas, such as ethylene ($C_2H_4$), methane ($CH_4$), acetylene ($C_2H_2$), ethane ($C_2H_6$), or combinations thereof.

The super-aligned array of carbon nanotubes can, opportunely, have a height of about 2 microns to 10 millimeters and includes a plurality of carbon nanotubes parallel to each other and approximately perpendicular to the substrate 10. In one embodiment, the carbon nanotubes have a height of about 100 microns to 900 microns. The super-aligned array of carbon nanotubes formed under the above conditions is essentially free of impurities, such as carbonaceous or residual catalyst particles. The carbon nanotubes in the super-aligned array are closely packed together by the van der Waals attractive force.

In step S20, the chamber 100 can be vacuumized to have a gas pressure less than or equal to 0.9 standard atmosphere pressures. The chamber 100 can be a vacuum chamber. Gas filled in the chamber 100 can be single gas, such as pure oxygen, pure nitrogen, pure carbon dioxide, or mixed gas such as atmospheric air, and gas mixed with oxygen and nitrogen. Simultaneously, the gas filled in the chamber 100 can be air with a density less than or equal to 1.14 kilogram per stere at normal atmospheric temperature. The lower the gas pressure of the chamber 100, the lower the density of the gas in the chamber 100. In one embodiment, the gas pressure of the chamber 100 is less than or equal to 0.2 standard atmosphere pressures; and the gas is atmospheric air with a density less than or equal to 0.25 kilogram per stere.

In step S30, the carbon nanotube film 40 can be drawn out from the carbon nanotube array 20 by the steps of: S301, contacting the carbon nanotube array 20 with an adhesive bar 51; and S302, moving the adhesive bar 51 away from the carbon nanotube array 20.

In step S301, the adhesive bar 51 can include a body with a side surface, and the side surface can be covered by an adhesive layer. The side surface of the body can be made of a material that has a great attractive force to the carbon nanotubes. Therefore, the side surface of the body can be used as a contacting surface to contact with a plurality of carbon nanotubes of the carbon nanotube array 20, and the carbon nanotubes can be firmly adhered to the side surface of the adhesive bar 51. The adhesive bar 51 can be fixed to a stretching device 50 via a fixing device 52. The fixing device 52 can be a generally U-shaped clamp with an adjustable opening facing the carbon nanotube array 20.

In step S302, when the adhesive bar 51 is driven to move away from the carbon nanotube array 20, a plurality of carbon nanotube segments can be pulled out from the carbon nanotube array 20 end-to-end to form the carbon nanotube film 40, due to the van der Waals attractive force between adjacent carbon nanotube segments. During the pulling process, an angle between a direction of pulling the carbon nanotube film 40 and the longitudinal direction of the carbon nanotube array 20 can be in a range of about 30 degrees to about 90 degrees. In one embodiment, the angle between the direction of pulling the carbon nanotube film 40 and the longitudinal direction of the carbon nanotube array 20 is about 85 degrees. An angle of about 85 degrees has been found to improve a uniformity of the carbon nanotube film 40. The longitudinal direction is substantially parallel to the central axis of most of carbon nanotubes. As shown in FIG. 2, the longitudinal direction of the carbon nanotube array 20 is substantially perpendicular to a top surface of the substrate 10.

When the carbon nanotube film 40 is continuously pulled out, a turbulence of the gas surrounding the carbon nanotube array 20 and the film 40 can occur and adversely impact the carbon nanotube film 40. The lower the density of the gas filled in the chamber 100, the lower the probability of the turbulences of the gas. Thus, if a speed of pulling the carbon nanotube film 40 remains constant, the number of defects of carbon nanotube film 40 can be decreased by decreasing the density of the gas filled in the chamber 100. The density of the gas filled in the chamber 100 is less than a density of air at 1 standard atmosphere pressure. Thus, fewer defects will occur in the carbon nanotube film 40 formed in the chamber 100 than in the room having a gas pressure substantially equal to or larger than 1 standard atmosphere pressure. Thus, uniformity of the carbon nanotube film 40 can be improved with the decrease of the gas pressure of the chamber 100. For example, if the speed of pulling the carbon nanotube film 40 is equal to or greater than 10 meters per second, the carbon nanotube film 40 can be obtained in the chamber 100 having a gas pressure less than or equal to 0.9 standard atmosphere pressures, but can not be obtained in the room having a gas pressure substantially equal to or larger than 1 standard atmosphere pressure.

Simultaneously, if there are an acceptable number of the defects occurring in the carbon nanotube film 40, the carbon nanotube film 40 can be pulled out from the chamber 100 with at a speed greater than 10 meters per second. For example, the speed of pulling the carbon nanotube film 40 can be greater than 550 meters per second, if an absolute vacuum exists in the chamber 100. In one embodiment, a speed of about 0.1 meters per second to 10 meters per second has been found to improve a uniformity of the carbon nanotube film 40.

The carbon nanotube film 40 includes a plurality of carbon nanotubes that can be arranged substantially parallel to a surface of the carbon nanotube film 40. A plurality of micropores having a dimension of about 1 nanometer to about 1 micrometer can be defined by the carbon nanotubes. A large number of the carbon nanotubes in the carbon nanotube film 40 can be oriented along a preferred orientation, meaning that a large number of the carbon nanotubes in the carbon nanotube film 40 are arranged substantially along the same direction. An end of one carbon nanotube is joined to another end of an adjacent carbon nanotube arranged substantially along the same direction, by van der Waals attractive force. More specifically, the carbon nanotube film 40 includes a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity and shape. The carbon nanotube film is capable of forming a free standing structure. The term "free standing structure" can be defined as a structure that does not have to be supported by a substrate. For example, a free standing structure can sustain the weight of itself when it is hoisted by a portion thereof without any significant damage to its structural integrity.

Figure 3:
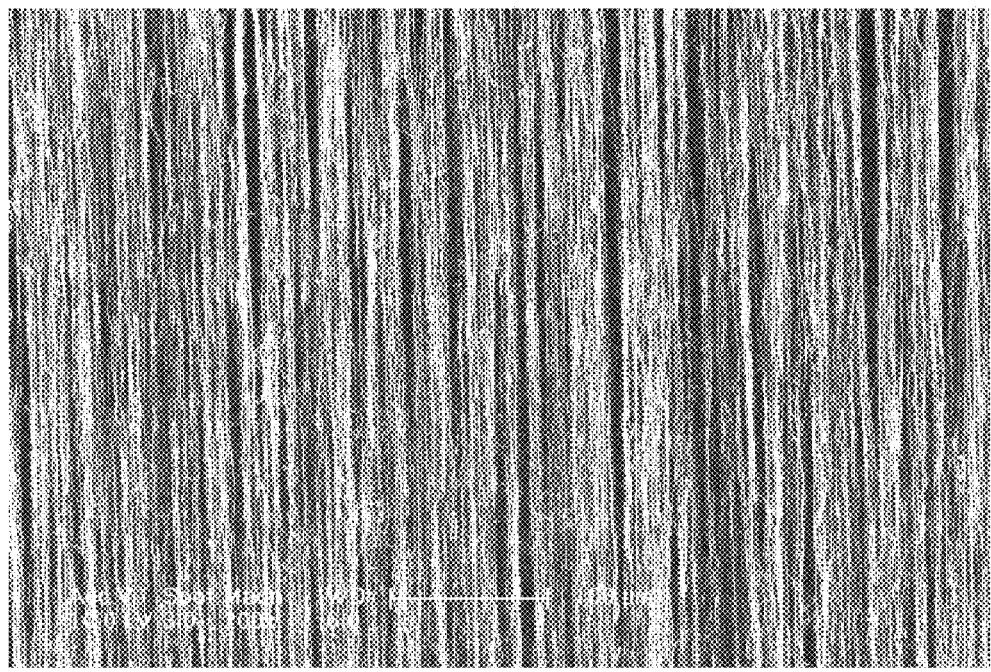
FIG. 3 shows a Scanning Electron Microscope (SEM) image of the carbon nanotube film.

Understandably, some variation can occur in the orientation of the carbon nanotubes in the carbon nanotube film 40 as can be seen in FIG. 3. Microscopically, the carbon nanotubes oriented substantially along the same direction may not be perfectly aligned in a straight line, and some curve portions may exist. Furthermore, it can be understood that some carbon nanotubes located substantially side by side and oriented along the same direction and in our contact with each other.

The method for fabricating a carbon nanotube film 40 can further include the following step: S40, depositing the carbon nanotube film 40 on a supporting element 60.

In step S40, the supporting element 60 can be a frame, a flat panel, or a wire rack. A material of the supporting element 60 can be metal, plastic, glass, or rubber. In one embodiment, the supporting element 60 is a square flat panel having a planar surface with the carbon nanotube film 40 directly deposited thereon.

During the process of depositing the carbon nanotube film 40 on the supporting element 60, the gas between the carbon nanotube film 40 and the supporting element 60 will be extruded to impact the carbon nanotube film 40. An intensity of the impact of the gas can be decreased with the density of the gas. Thus, when the supporting element 60 is moved towards the carbon nanotube film 40 at a predetermined speed, the number of defects of carbon nanotube film 40 can be decreased because of the density of the gas in the chamber 100.

Figure 4:
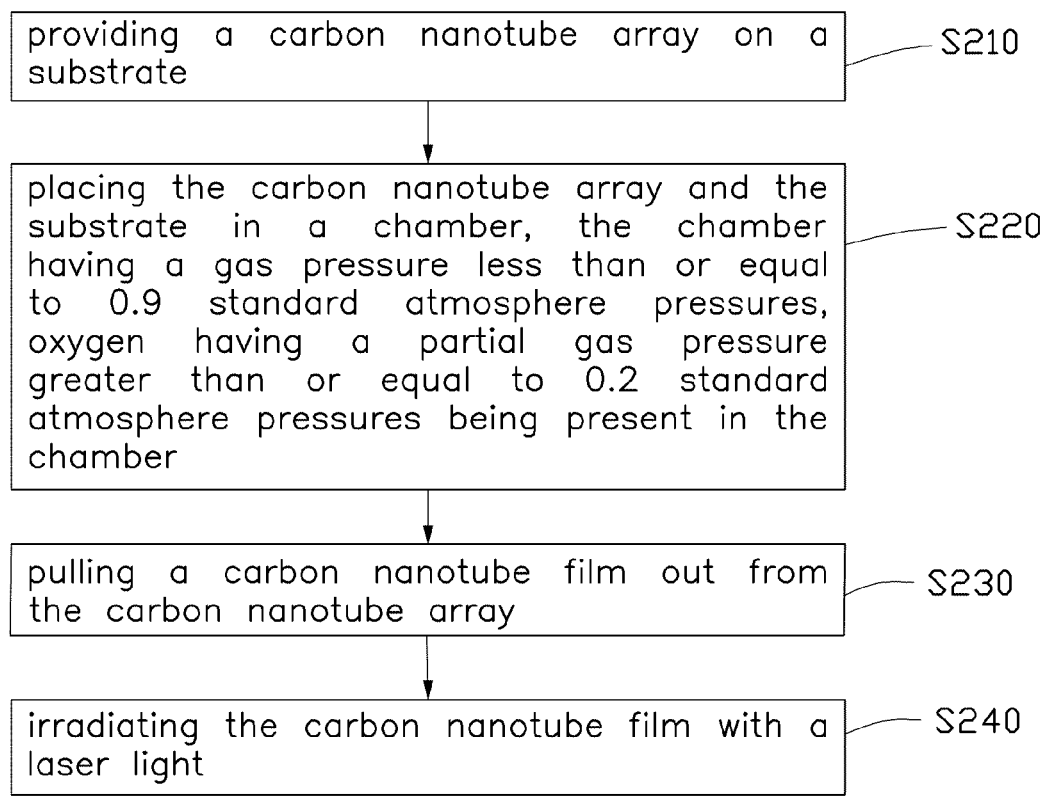
FIG. 4 is flow chart of a method for fabricating a carbon nanotube film of one embodiment.

Referring to FIG. 4, an embodiment of a method for fabricating a carbon nanotube film includes the following steps:

S210, providing a carbon nanotube array on a substrate;

S220, placing the carbon nanotube array and the substrate in a chamber, the chamber having a gas pressure less than or equal to 0.9 standard atmosphere pressures, oxygen having a partial gas pressure greater than or equal to 0.2 standard atmosphere pressures being present in the chamber;

S230, pulling a carbon nanotube film out from the carbon nanotube array; and

S240, irradiating the carbon nanotube film with a laser light.

In step S240, the laser light can be emitted by a laser installed in or outside the chamber. The oxygen present in the chamber can be capable of supplying a working condition for the laser. A density of the oxygen in the chamber is greater than a density of oxygen in normal air. The laser light can be capable of improving a transmittance of the carbon nanotube film and decreasing a thickness of the carbon nanotube film. During the process of irradiating the carbon nanotube film, some of carbon nanotubes in carbon nanotube film can be oxidized to form waste gas such as carbon dioxide. The waste gas can quickly diffuse away from the carbon nanotube film due to the low gas pressure in the chamber.

Simultaneously, the method for fabricating a carbon nanotube film can also include the following step: S250, depositing the carbon nanotube film on a supporting element in a manner similar to that of step S40.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

What is claimed is:

1. A method for fabricating a carbon nanotube film, comprising:
    providing a chamber and a carbon nanotube array on a substrate;
    placing the carbon nanotube array and the substrate in the chamber, wherein the chamber has a gas pressure less than or equal to 0.9 standard atmosphere pressures, and oxygen is present in the chamber;
    pulling the carbon nanotube film out from the carbon nanotube array; and
    irradiating the carbon nanotube film with a laser light.

2. The method as claimed in claim 1, wherein the chamber is a vacuum chamber.

3. The method as claimed in claim 1, wherein a speed of pulling the carbon nanotube film is greater than 10 meters per second.

4. The method as claimed in claim 1, wherein a speed of pulling the carbon nanotube film is from about 0.1 meters per second to about 10 meters per second.

5. The method as claimed in claim 1, wherein a speed of pulling the carbon nanotube film is greater than 550 meters per second, if an absolute vacuum exists in the chamber.

6. The method as claimed in claim 1, wherein a partial gas pressure of the oxygen is greater than 0.2 standard atmosphere pressures.

7. The method as claimed in claim 1, further comprising: depositing the carbon nanotube film on a supporting element.

8. The method as claimed in claim 7, wherein the supporting element is selected from the group consisting of a frame, a mesh, and a flat panel.

9. The method as claimed in claim 7, wherein the depositing the carbon nanotube film on the supporting element comprises moving the supporting element towards the carbon nanotube film.

10. The method as claimed in claim 1, wherein an angle between a direction of pulling the carbon nanotube film and a direction perpendicular to the substrate is in a range of 30 degrees to 90 degrees.

11. The method as claimed in claim 10, wherein the angle is 85 degrees.

12. The method as claimed in claim 1, wherein the carbon nanotube array comprises a plurality of carbon nanotubes directly formed on the substrate by chemical synthesis.

13. The method as claimed in claim 1, further comprising:
    contacting the carbon nanotube array with an adhesive bar; and
    moving the adhesive bar away from the carbon nanotube array.

14. A method for making a carbon nanotube film, comprising:
    providing a vacuum chamber, under a vacuum, having a carbon nanotube array therein; and
    pulling a carbon nanotube film out from the carbon nanotube array;
    oxidizing some of carbon nanotubes of the carbon nanotube film forming waste gas.

15. The method as claimed in claim 14, wherein a density of oxygen filled in the vacuum chamber is greater than a density of oxygen in atmospheric air.

16. A method for making a carbon nanotube film, comprising:
    providing a carbon nanotube array on a substrate;
    placing the carbon nanotube array and the substrate in a chamber, the chamber having a gas pressure less than or equal to 0.9 standard atmosphere pressure and oxygen, with a partial gas pressure greater than or equal to 0.2 standard atmosphere pressures;
    pulling the carbon nanotube film out from the carbon nanotube array; and
    irradiating the carbon nanotube film with a laser light.

17. The method as claimed in claim 16, wherein the gas pressure of the chamber is equal to 0.2 standard atmosphere pressures.

* * * * *